United States Patent
Hardy

(10) Patent No.: US 7,085,230 B2
(45) Date of Patent: Aug. 1, 2006

(54) METHOD AND SYSTEM FOR EVALUATING THE QUALITY OF PACKET-SWITCHED VOICE SIGNALS

(75) Inventor: William Christopher Hardy, Dallas, TX (US)

(73) Assignee: MCI, LLC, Basking Ridge, NJ (US)

( * ) Notice: Subject to any disclaimer, the term of this patent is extended or adjusted under 35 U.S.C. 154(b) by 688 days.

(21) Appl. No.: 09/778,186

(22) Filed: Feb. 7, 2001

(65) Prior Publication Data

US 2002/0114296 A1   Aug. 22, 2002

Related U.S. Application Data

(63) Continuation-in-part of application No. 09/220,733, filed on Dec. 24, 1998, now Pat. No. 6,370,120.

(51) Int. Cl.
*G01R 31/08* (2006.01)

(52) U.S. Cl. .................. 370/232; 370/244; 370/352

(58) Field of Classification Search ............. 370/252, 370/253, 232, 233, 234, 352, 356, 357, 358, 370/242, 244, 245, 250; 704/228, 270.1, 704/200, 233, 234; 709/223, 224, 225, 226
See application file for complete search history.

(56) References Cited

U.S. PATENT DOCUMENTS

| | | | |
|---|---|---|---|
| 4,015,480 A * | 4/1977 | Giers ....................... | 73/462 |
| 4,438,511 A | 3/1984 | Baran | |
| 5,119,367 A | 6/1992 | Kawakatsu et al. | |
| 5,200,950 A | 4/1993 | Foglar et al. | |
| 5,282,203 A * | 1/1994 | Oouchi ..................... | 370/232 |
| 5,428,613 A | 6/1995 | Spiotta et al. | |
| 5,479,576 A | 12/1995 | Watanabe et al. | |
| 5,539,310 A | 7/1996 | Basser et al. | |
| 5,553,059 A | 9/1996 | Emerson et al. | |
| 5,572,570 A | 11/1996 | Kuenzig | |
| 5,715,372 A | 2/1998 | Meyers et al. | |
| 5,742,929 A | 4/1998 | Kallman et al. | |
| 5,825,849 A | 10/1998 | Garland et al. | |
| 5,835,565 A | 11/1998 | Smith et al. | |
| 5,867,813 A | 2/1999 | Di Pietro et al. | |
| 5,887,027 A | 3/1999 | Cohen et al. | |
| 5,898,668 A * | 4/1999 | Shaffer ..................... | 370/230 |

(Continued)

FOREIGN PATENT DOCUMENTS

| | | |
|---|---|---|
| EP | 1079573 | 2/2001 |
| WO | 98/59509 | 12/1998 |
| WO | 00/33511 | 6/2000 |

OTHER PUBLICATIONS

ITU-T, Methold for subjective determination of transmission quality, Aug. 1996, P.800, entire document.*

(Continued)

*Primary Examiner*—Chau Nguyen
*Assistant Examiner*—Ian N. Moore

(57) ABSTRACT

A method and apparatus for determining what level of performance must be maintained by a second communication service so as to be perceived as being of equal quality to a first communication service, especially where the second communication service is subject to additional impairments not experienced by the first communication service. In one example embodiment, the present invention is applied to determining what combinations of packet loss rate and packet delay are tolerable where a packet switched telephony service is desired to be perceived to be substantially equivalent to a traditional toll-quality non-packet-switched telephone service. Empirically derived models are used to relate user perception to objectively measurable characteristics, such as packet loss rate.

32 Claims, 9 Drawing Sheets

U.S. PATENT DOCUMENTS

| | | | |
|---|---|---|---|
| 5,933,475 | A | 8/1999 | Coleman |
| 5,940,471 | A | 8/1999 | Homayoun et al. |
| 5,940,479 | A | 8/1999 | Guy et al. |
| 5,978,783 | A * | 11/1999 | Meyers et al. ............... 706/21 |
| 6,041,048 | A | 3/2000 | Erickson et al. |
| 6,046,979 | A | 4/2000 | Bauman |
| 6,064,653 | A | 5/2000 | Farris |
| 6,067,350 | A | 5/2000 | Gordon |
| 6,094,464 | A | 7/2000 | Ebringer et al. |
| 6,111,949 | A | 8/2000 | Sheets et al. |
| 6,128,291 | A | 10/2000 | Perlman et al. |
| 6,147,988 | A | 11/2000 | Bartholomew et al. |
| 6,169,896 | B1 * | 1/2001 | Sant et al. ............... 455/424 |
| 6,172,970 | B1 | 1/2001 | Ling et al. |
| 6,192,109 | B1 | 2/2001 | Amrany et al. |
| 6,243,373 | B1 * | 6/2001 | Turock ..................... 370/352 |
| 6,246,978 | B1 | 6/2001 | Hardy |
| 6,256,304 | B1 | 7/2001 | Vayrynen |
| 6,256,608 | B1 | 7/2001 | Malvar |
| 6,275,797 | B1 | 8/2001 | Randic |
| 6,282,192 | B1 | 8/2001 | Murphy et al. |
| 6,285,653 | B1 | 9/2001 | Koeman et al. |
| 6,304,634 | B1 | 10/2001 | Hollier et al. |
| 6,353,609 | B1 | 3/2002 | Ethridge et al. |
| 6,356,601 | B1 | 3/2002 | Chen et al. |
| 6,363,065 | B1 | 3/2002 | Thornton et al. |
| 6,370,120 | B1 | 4/2002 | Hardy |
| 6,377,636 | B1 | 4/2002 | Paulraj et al. |
| 6,389,005 | B1 * | 5/2002 | Cruickshank ............. 370/352 |
| 6,434,606 | B1 | 8/2002 | Borella et al. |
| 6,452,922 | B1 * | 9/2002 | Ho ............................ 370/352 |
| 6,512,746 | B1 * | 1/2003 | Sand ......................... 370/252 |
| 6,574,216 | B1 * | 6/2003 | Farris et al. ............... 370/352 |
| 6,618,385 | B1 | 9/2003 | Cousins |
| 6,633,545 | B1 | 10/2003 | Milbrandt |
| 6,665,271 | B1 * | 12/2003 | Thomas et al. ............ 370/252 |

OTHER PUBLICATIONS

ITU-T, Methold for evaluation of service from standpoint of speech transmission quality, 1993, P.82, entire document.*

ITU-T, Subjective performance assesment of telephone-band and wideband digital codecs, Feb. 1996, P.830, entire document.*

ITU-T, Subjective listenign test methold for evaluationg digital circuit multiplication and packetized voice systems, Mar. 1993, P.84, entire document.*

ITU-T, Methold for subjective performance assesment of quality of speech voice output devices, Jun. 1994, P.85, entire document.*

Peng et al., "Bark Scale Equalizer Design Using Warped Filter", IEEE, 2001, pp. 3317-3320.

Baker, et al., "PPP Bridging Control Protocol (BCP)", Internet Engineering Task Force, Request for Comment 1638, Jun. 1994.

Chan et al., "Differentiated Services Quality of Service Policy Information Base", Internet Engineering Task Force, Request for Comment 3317, Mar. 2003.

Schulzrinne, et al., "RTP: A Transport Protocol for Real-Time Applications", Internet Engineering Task Force, Request for Comments: 1889, Jan. 1996.

ITU-T, Series G: Transmission System and Media, Digital Systems and Networks, Recommendation G.107, May 2000.

ITU-T Study Group 12, "Objective Quality Measurement of Telephone-Band (300-3400Hz) Speech Codecs", ITU-T Recommendation P.861, Feb. 27, 1998, pp. 1-33.

ITU-T Study Group 12, "Perceptual Evaluation of Speech Quality (PESQ): An Objective Assessment of Narrow-Band Telephone Networks and Speech Codecs", ITU-T Recommendation P.862, Feb. 23, 2001[12].

Anonymous, "Real=Time Quality Measurement for Telecommunication Call—By Alerting Subscriber of Call Selected to be in Sample Before Going to Operator", WPI World Patent Information Derwent, Derwent, GB, vol. 46, No. 92, Oct. 25, 1992[12].

Smith III et al., "Bark and FRB Bilinear Transforms", IEEE, 1999, pp. 697-708.

* cited by examiner

No Appreciable Packet Loss

Packet Loss of 5 packets/min

Packet Loss of 15 packets/min

METHOD AND SYSTEM FOR EVALUATING THE QUALITY OF PACKET-SWITCHED VOICE SIGNALS

CROSS-REFERENCE TO RELATED APPLICATIONS

This application is a continuation-in-part of U.S. patent application Ser. No. 09/220,733 filed Dec. 24, 1998 now U.S. Pat. No. 6,370,120, which is hereby incorporated by reference herein.

The following commonly assigned U.S. patent applications are hereby incorporated herein by reference:

| U.S. patent or Ser. No. | Filing Date | Attorney Docket No. |
|---|---|---|
| 08/751,203 | Nov. 18, 1996 | VON-96-001 |
| 08/798,350 | Feb. 10, 1997 | VON-97-004 |

FIELD OF THE INVENTION

This invention relates generally to telecommunications and specifically to a method and system for evaluating the quality of packet-switched voice signals.

BACKGROUND OF THE INVENTION

Telephone connections have always been subject to impairments in the form of noise, attenuation, distortion, crosstalk, and echo. Such impairments are particularly common to analog portions of the connection, such as along subscriber loops and within frequency domain multiplexing equipment. Digital transmission alleviates many of these problems but introduces new impairments such as quantization noise or glitches. Even using perfect digital transmission for long-haul connections, a typical telephone connection includes many analog components, such as hybrids, where impairments can occur.

A poor connection or a malfunctioning piece of equipment can produce conditions that a telephone customer will find objectionable or intolerable, so that the connection is deemed to be of very poor quality. When there is a high incidence of such poor connections, customers may complain to the service provider or regulatory authorities, or simply change service providers. Perceived quality of telephone connections is therefore a major factor affecting the reputation and marketability of long distance telephone services.

To guard against poor quality, telephone service providers have developed methods to take objective quality measurements upon a telephone line, a piece of equipment, or even an end-to-end telephone connection. These measurements can help the service provider detect and gauge impairments, pinpoint weak elements and correct deficiencies that degrade user perception of quality.

Many such objective measurements are well known and standardized in the art. Empirically-derived thresholds enable analysts to infer the existence and severity of quality problems by comparing measurements to tables of acceptable values. For example, power levels of test signals and quiet channel noise can be measured electronically. It is well known that a certain range of signal levels must reach a telephone receiver to produce acceptable volume at the earpiece and that the C-weighted noise must be substantially less than the signal level to keep users from experiencing unacceptable noise at the earpiece. The combination of signal and noise measures for a particular connection may be used to determine the likelihood that a user would claim to have difficulty in hearing speech through the phone.

For any one of these objective measurements, the effect of extreme values on user perception of quality is clear, and there are coarse thresholds to define "no effect" and "substantial degradation" conditions. However, for intermediate values and combinations of impairments, there is generally no clear division between values representing acceptable and unacceptable connection quality. Speech clarity and perceived connection quality depend on many variables, including, for example, speech content, talker rhythms, subjective perception of the listener, and users' acclimation to their telephone service. As a result, the correlations between values of objective measures and user perception of connection quality are statistical, representing the combined effects of many different kinds of impairments and variations of sensitivity to them among the population.

Earlier work in this field by the present inventor has created mappings between objective measurements and perceived quality, so that, for example, when a given circuit is measured in terms of signal level, noise, distortion, crosstalk, and echo using electronic measurement equipment, the mapping predicts the percentage of conversations that would be reported as being significantly impaired or of poor quality as perceived by an average user population. Such mappings have proven to be a powerful tool for analyzing reported impairments and for gauging acceptable performance of a new line or piece of equipment before deployment.

The mapping was produced by creating or finding telephone circuits having various combinations of measurable characteristics and then having a population of callers conduct test calls through such telephone circuits to subjectively gauge the quality of each call. For each test call, the circuit under analysis was rated on a scale of None-Some-Much for each of the impairments manifested to users of the connection. These impairments included noise, volume, distortion, and echo. Each of the subjectively rated impairments was related to the selected objectively measurable characteristics. The statistics from a large number of such empirical trials with ratings of None-Some-Much for each characteristic may be referred to as Service Attribute Test (SAT) data which characterizes the quality of a communications service.

For each test call described above, each caller also provided an opinion score, which was an overall rating of the circuit quality on a numerical scale. Furthermore, each caller also determined whether the overall effect of the impairments was to render the connection as:

unusable (U; rendering the channel entirely unusable), difficult (D; causing enough difficulty to require adaptation by the speaker and listener), irritating (I; disturbing but not requiring adaptation by the speaker and listener), noticeable (N; being minor enough to be ignored), or unnoticeable (O; having no effect on quality).

The percentage of calls or connections that elicit any one of the first three responses (unusable, difficult, or irritating) is called the P(UDI). The P(UDI) is of particular interest to service providers as a meter of customer satisfaction because it has been shown that overall satisfaction decreases as P(UDI) increases, regardless of average opinion score.

Analysis of empirical data including user reports of impairments and perception quality, together with user reports of impairments obtained in conjunction with objective measurements of connection characteristics, then supported a two step development of a means for predicting user perception of quality from objective measurements. First, a model was produced supporting prediction of P(UDI) and average opinion score as a function of percentages of calls with each of the possible combinations of "none," "some," and "much" (N, S, M) conditions reported for each of the impairments. Then, objective measurements were correlated with user reports of impairments to predict the proportion of N, S, M ratings likely to be reported by users as a function of the objective measurements. From these two elements, it was thereafter possible to take measurements of the objective characteristics for connections and translate the set of measures obtained into estimates of likely user perception of quality as revealed by the P(UDI) and an average opinion score.

While traditional circuit-switched telephone networks have been extensively characterized by such an approach, the recent trend toward packet-switched telephony (Internet telephony) has created a need to characterize a telephony channel that is subject to some new impairments. Packet switched networks are generally unsuited to ensuring that transmission delay is fixed or that data packets arrive in sequence, or even at all. This behavior is tolerable for transferring data files and messages, because packets arriving out of order can simply be arranged and lost packets can be retransmitted. However, in packet switched telephony, voice signals are digitized and encoded into a steady stream of discrete packets. Any interruptions or delay variations in transmitting voice data packets, even on the order of milliseconds, can affect the ability to reconstruct the voice signal at the receive end. This problem is further magnified when "codecs" are used to compress or encode the digitized voice signal for more efficient use of data transmission bandwidth. If a sophisticated codec is used and the data stream looses a crucial packet required for reconstructing the voice waveform, the result may be heard as a momentary drop-out, garbled speech, distortion, or a buzzing sound.

Voice over an Internet protocol, sometimes abbreviated as "VoIP", offers many potential technological and economic benefits. However, large-scale deployment of VoIP is hindered by the confusion over how much VoIP transport will affect the user's perception of voice channel quality. For the companies seeking to deploy and gain revenue from VoIP to compete with so-called "toll-quality" telephony service, there is a large risk that users will find the quality of service unacceptable and will revert to using traditional telephone networks.

There is a need to determine what incidences of packet delay and packet loss are tolerable in packet switched telephony without causing any perceptible degradation in service. The traditional telephone network is an established first communications service that has been well characterized by extensive experiments. The packet switched environment may be viewed as a second communications service with both similarities to and differences from the first communications service.

Therefore, where the quality of a first communications service is well characterized and deemed acceptable, there is a need to establish the requisite performance of a second communication service to be comparable to the first communications service. This is particularly important where the second communication service is subject to additional impairments not applicable to the first communications service and where such additional impairments vary in severity and frequency. Furthermore, because different codec schemes vary in their behavior and susceptibility to packet loss, there is a need to characterize the requisite performance of the second communications network in the context of a particular codec scheme.

A technique is required for taking into account multiple added impairments, apportioning the influences of each added impairment toward the composite quality requirements, and devising a useful way of expressing the required performance of a communications service subject to the combination of added impairments.

It is further desirable to, as much as possible, rely upon established statistics related to impairments common to both first and second communications services, so that knowledge of the first communications service may spare considerable time and effort in determining acceptable performance of the second communication service.

SUMMARY

The present invention provides a technique for determining what level of performance must be maintained by a second communication service so as to be perceived as being of equal quality to a first communication service, especially where the second communication service is subject to additional impairments not experienced by the first communication service. The present invention is useful, for example, in determining what combinations of packet loss and packet delay are tolerable where a packet switched telephony service is desired to be perceived to be substantially equivalent to a traditional toll-quality non-packet-switched telephone service. The performance requirements for the second communication service are expressed in terms of objectively measurable characteristics. Furthermore, in the cases where codecs may be used in conjunction with the packet-switched transport, the present invention provides for characterizing the performance of the second communication service in the context of a particular codec scheme.

The quality of a communication service is determined by measurable performance characteristics which, by applying the appropriate models, may be used to predict quality indices. These quality indices, such as mean opinion score (MOS) and P(UDI), summarize the quality of the communication service as perceived by users of the service on average. The present invention provides a technique whereby a second communication service may be deemed to be perceptually equivalent to a first communications service if the mean opinion score of second service differs from that of the first service by less than a certain amount. For example, where the mean opinion scores are placed on a scale of 0.0 to 4.0, it has been found that if the MOS of the second service is within 0.2 units of the first service, then the second service is perceived as being of essentially the same quality as the first service. In other words, the difference of 0.2 in such a case is imperceptible. The present disclosure further teaches that the P(UDI) of a service must also be maintained at less than 0.06 in order for a service to be acceptable to users, regardless of any other factors. Thus, in one instance, it is found that the MOS of a second communication service must be maintained within 0.2 points of that of an accepted first communication service and that the P(UDI) of the second service must be maintained less than 0.06, taking all impairments into account.

Where a second communications service is to be assessed in relation to a first communication service, and where the second communication service is subject to additional impairment effects, the quality of the second communication service may be determined largely based upon the existing data for the first communication service. This is a substantial advantage as such original data may comprise useful data from thousands of test calls. In accordance with the teachings of the present invention, much of the pre-existing data pertaining to the first communications service may be modified to reflect the influence of the additional impairments in the context of the second communications service. This aspect obviates the need to repeat large numbers of empirical experiments to characterize the second communications service.

The present invention provides a technique for taking into account the influences of packet transport phenomena upon the quality of a communications service. The present invention provides a technique for establishing required performance characteristics, in terms of packet loss and packet delay, for a packet-based communications service such that the service is perceived as being of substantially the same quality as a non-packet-based communication service.

In accordance with a preferred exemplary embodiment of the present invention, packet loss in a packet-switched network is accounted for based upon its manifestation as a form of speech distortion. If a packetized voice signal is missing some packets, a listener may perceive speech distortion. The severity of speech distortion may depend on which, if any, codec scheme is employed. A technique is taught whereby the effects of packet loss upon perceived speech distortion are characterized and then this relationship is used to transform existing service attribute data to reflect the further effects of packet loss.

The present invention provides a technique for determining which of multiple impairments and which of the final criteria is the limiting factor in maintaining the performance of a communications service. In one exemplary embodiment, an iterative approach is taken with various combinations of packet delay and packet loss values to create an overall profile of required performance.

To address the random variation in the occurrence of impairments, a preferred embodiment of the present invention involves describing performance criteria in terms of what proportion of communications may succumb to a given worst case set of impairments while still meeting average quality requirements.

The present invention also provides a technique for regarding multiple impairments in conjunction with one another. For example, in the context of packet switched communications, it is found that packet delay affects P(UDI) in a non-linear fashion, but independently of other characteristics. An aspect of the present invention provides for assessing the impact of packet delay independently and then accordingly reducing the margin remaining for degradations caused by other performance characteristics.

The techniques of the present invention allow objective measurements to replace subjective measurements upon a channel. This yields an improvement, for example, in gauging performance of a channel or a communications element before it is put into service. The objective assessment of an Internet telephony channel is expressed in a way that is relevant to perceived quality.

The present invention can be used in a variety of ways. For example, a phone system or a portion of a phone system (e.g., a line or a piece of equipment) can be tested before being used commercially. In another application, a workstation stores and analyzes objective measurements. This workstation can be used by an engineer troubleshooting a network or a sales engineer comparing qualities of various options. The present invention could also be used in an automatic, real-time control system for a communications network.

BRIEF DESCRIPTION OF THE DRAWINGS

The present invention, as well as additional features and advantages thereof, may be better understood by reading the following detailed description of an exemplary embodiment in conjunction with the accompanying drawings wherein.

DETAILED DESCRIPTION

The making and use of the various embodiments are discussed below in detail. However, it should be appreciated that the present invention provides many applicable inventive concepts that can be embodied in a wide variety of specific contexts. The specific embodiments discussed are merely illustrative of specific ways to make and use the invention and do not limit the scope of the invention.

Figure 1A:
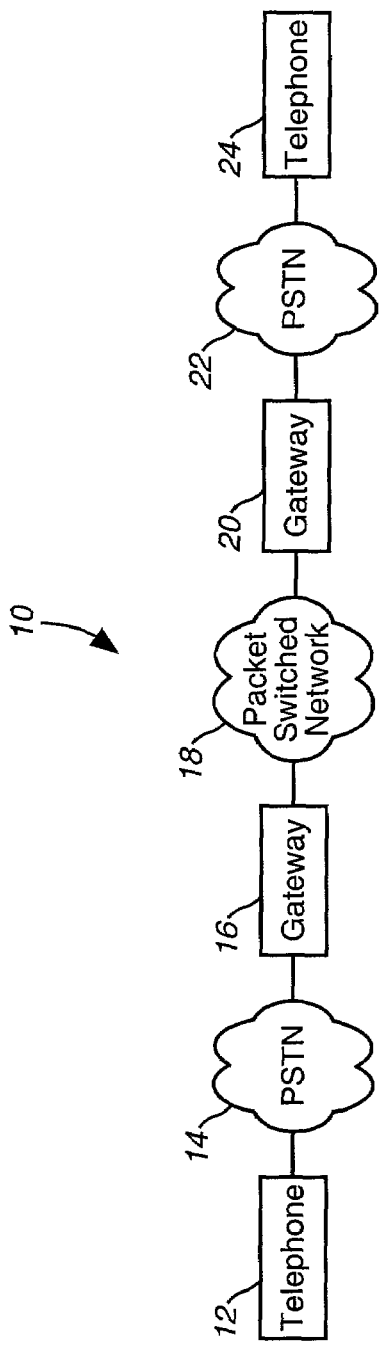
FIGS. 1a and 1b are examples of two communications networks that can utilize the present invention.
Figure 1B:
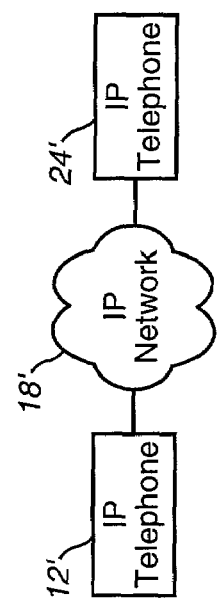

In one aspect, the present invention allows for a correlation between objective measurements and perceived quality in the context of a packet-switched communications service. FIGS. 1a and 1b illustrate simplified block diagrams of two examples of communications networks wherein the present invention may be utilized. Referring first to FIG. 1a, a hybrid telephone network 10 includes both circuit switched network portions 14 and 22 and a packet-switched network portion 18. To utilize the hybrid telephony network 10, an initiating telephone 12 initiates a call with the circuit switched network 14. In the preferred embodiment, the initiating telephone 12 is an ordinary telephone and the circuit switched network 14 is the public switched telephone network (PSTN). The present invention, however, is equally applicable to use with proprietary equipment and private networks.

Circuit switched network 14 routes the call to a gateway 16, sometimes referred to as an internet telephony gateway (ITG). Gateway 16 converts the circuit switched telephone signals into packets that are compatible with the packet-switched network 18. While many protocols can be utilized, most current networks carrying packet-switched voice use Internet Protocol (IP). Gateway 16 will also have access to a directory (not shown) of addresses (e.g. IP addresses for an IP-based network). Utilizing this directory, gateway 16 addresses the packets to an appropriate exit gateway 20.

The voice signals are then transported through packet-switched network 18 from gateway 16 to gateway 20. Packet-switched network 18, sometimes referred to as a converged network, combines various types of media, such as voice calls, data, and streams of video, onto a single line. All these different media are chopped into discrete blocks of data or packets. As mentioned above, packet-switched network 18 can be an IP-based network.

One example of an IP-based network is the public Internet. In this context, the "Internet" (uppercase "I") or public Internet is used to connote the worldwide collection of interconnected networks that uses Internet Protocol (IP) to link a large number of physical networks into a single logical network. Physically, the Internet is a huge, global network spanning nearly 100 countries and comprising a great number of academic, commercial, government, and military networks.

Packet-switched network 18 might also comprise other IP-based networks as well as other communication networks. For example, packet-switched network 18 could comprise an internet which is not connected to the public Internet. In this context, an "internet" (lowercase "i") is any collection of separate physical networks, interconnected by a common protocol, to form a single logical network. An internet would preferably, but not necessarily use Internet Protocol. An internet which is owned by a single entity is sometimes referred to as an intranet or virtual private network. Network 18 may comprise an intranet, which is or is not connected to the Internet.

For final delivery, gateway 20 converts the packets back into a format that is compatible with circuit switched network 22. As before, in the preferred embodiment circuit switched network 22 is the PSTN. In other words, circuit switched network 14 and circuit switched network 22 may be two portions of the same network, for example in two different parts of the country or the world. The telephone call can then be routed to receiving telephone 24.

The telecommunications network of FIG. 1b is similar to that of FIG. 1a except that it is an end-to-end packet-switched network. In this case, the initiating telephone 12' can generate packet-switched signals and provide these directly to packet-switched network 18'. In this embodiment, the packets can be generated either by telephone 12' or by equipment (not shown) that is relatively close to telephone 12' (for example, in the same building). The call is routed across packet-switched network 18' to receiving phone 24'.

Further details on hybrid and end-to-end packet-switched networks are provided in commonly assigned patent applications Ser. No. 08/751,023 filed Nov. 18, 1996 and Ser. No. 08/798,350 filed Feb. 10, 1997, each of which is incorporated herein by reference.

Figure 2:
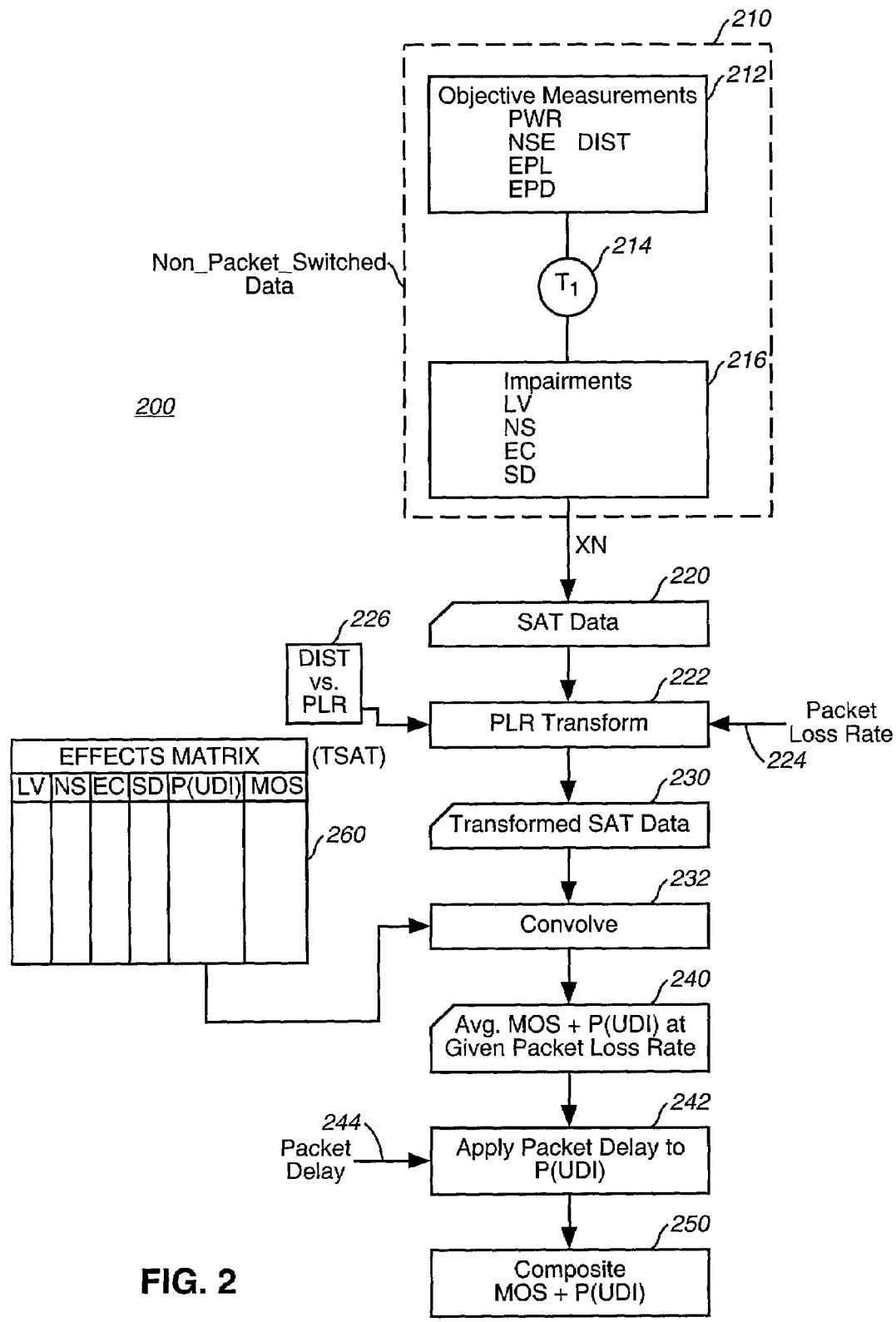
FIG. 2 is a pictorial description of how objective and subjective measurements upon a communications service may be processed in accordance with an exemplary embodiment of the present invention.

FIG. 2 describes the manner in which data from objective and subjective measurements of a communications service may be processed in accordance with a preferred embodiment of the present invention. In FIG. 2 data flow diagram 200 comprises objective measurements 212 which may be used to derive perceived impairments 216 by the application of transform 214. Objective measurements 212 comprise signal power (PWR), C-weighted noise(NSE), echo path delay (EPD), echo path loss (EPL), and waveform distortion (DST). Impairments 216 are analogous to subjective ratings of perceived impairments, namely low volume (LV), noise (NS), echo (EC), and speech distortion (SD). Note that various combinations of objective measurements 212 will affect different ones of the subjectively rated impairments 216. As described earlier herein, empirical experiments under varying conditions of signal power, noise level, etc. enable a transform 214 to be constructed which accurately predicts impairments 216 that will reported in response to a given combination of objective measurements 212. A manner in which transform 214 may be established by empirical experiments is described briefly earlier herein and in U.S. patent application Ser. No. 09/220,733.

It should be noted that transform 214 maps objective measurements to impairments regardless of the actual mechanism of signal transport chosen. Any communications service exhibiting a particular combination of signal and noise levels and other characteristics will be similarly rated by listeners regardless of whether the signal is actually traversing radio signals, PCM codecs, long-haul TDM equipment, or a packet-switched data network.

Where the quality of a particular communications service is to be measured, many sets of objective measurements 212 may be recorded. Each such set of measurements is then converted using transform 214 into a set of impairments 216. A set of impairments 216 may comprise the four impairments LV, NS, EC, and SD each rated in terms of none, some or much. It is also possible to directly collect subjective measurements of impairments 216 from a communications service by conducting test calls, although this practice is tedious and disadvantageous where transform 214 is already well established.

A measurement set 210 may comprise objective measurements 212 transformed into a set of impairments 216 or may comprise a set of subjectively rated impairments 216 directly obtained from test calls through a communications service. A large number of measurement sets 210 pertaining to given communication service may be said to comprise the service attribute test (SAT) data 220 for the service. As described in U.S. patent application Ser. No. 09/220,733, the SAT data 220 for a given communication service may be convolved with an effects matrix 260 to yield an estimate of mean opinion score and P(UDI) for the service. In a similar fashion to transform 214, effects matrix 260 is a prediction model that may be constructed from large numbers of empirical observations to correlate reported impairments to overall MOS and P(UDI) values.

In accordance with a preferred embodiment of the present invention, SAT data 220 undergoes further processing before being convolved with effects matrix 260. A packet loss rate (PLR) transformation 222 is applied based upon a presumed packet loss rate 224. As will be described in greater detail below, transformation 222 redistributes, within SAT data 220, the proportions of reporting various combinations of impairments. In essence, the reporting of the speech distortion impairment is augmented in relation to how much packet loss is occurring. Transformation 222 draws upon a table 226 relating reports of speech distortion versus packet loss rate when all other impairments are negligible. The result of transformation 222 is transformed SAT data 230 which reflects the performance of a communication service suffering a level of packet loss rate in conjunction with whatever other impairments were present in SAT data 220 prior to PLR transformation 222.

Transformed SAT data 230 is then convolved with effects matrix 260 as represented by convolve process block 232. The result is an estimated set of MOS and P(UDI) values 240 taking into account the rate of packet loss 224 provided as input earlier.

Next, the effects of packet delay are applied to the P(UDI). A packet delay 244 is provided as input and, as represented by processing block 242, the effects of packet delay upon P(UDI) are calculated and applied to the P(UDI). It may be generally said that the greater the packet delay, the more P(UDI) is increased. It has been determined experimentally by the present inventor that packet delay affects P(UDI) independently of other impairments. Therefore, it suffices to apply the effects of packet delay after all other impairments are accounted for and to do so without repeating the development of transform 214 or effects matrix 260.

After packet delay is taken into account in block 242, the result is the composite MOS and P(UDI) for the communication service with both a given packet delay and packet loss rate represented.

In accordance with a preferred embodiment, the SAT data pertains to a first communications service, namely a traditional toll-quality telephone connection. It is presumed that, in terms of the power, noise, echo and waveform distortion, the performance of a packet switched service will be comparable to or better than an optimum telephone connection. For purposes of conservatively estimating requisite performance for a second communication service, it is assumed that the second communication service will, at best, match the quality of the first communication service. In the case of packet-switched versus circuit-switched telephony, this a reasonable assumption because, as described earlier, a communication system based on packet-switched transport involves some analog equipment at some point and is subject to many of the same impairments as a traditional analog telephone connection.

It should be noted that FIG. 2 is provided for describing the interactions among various pieces of information in accordance with an exemplary embodiment. The actual process steps by which data is acted upon are described in conjunction with FIGS. 6 and 7 below.

Each of the objectively measurable characteristics will lead to a manifestation in the perceived quality of the voice signal. Table 1 provides a listing of some manifestations corresponding to selected measurable characteristics. Other characteristics could also or alternatively be utilized.

TABLE 1

| Objective Characteristic | Manifestation |
| --- | --- |
| Loss (or level) | Low volume |
| Noise | Noisiness |
| Waveform distortion | Speech distortion |
| Packet loss | Speech distortion |
| Echo path delay | Echo |
| Echo path loss | Echo |

The level for each objective characteristic is transformed into an expected percentage of the population that would categorize the manifestation into one of a number of subjective quantifications. Different manifestations (or quality characteristics) can have different numbers of subjective quantifications. For example, in the preferred embodiment three subjective quantification categories—none, some and much—are defined for each quality characteristic. Test subjects are then instructed to rate the presence of an impairment as "none" if it is absent, "much" if it is present and very noticeable, and "some" otherwise.

Subjective evaluators are used to determine the correlation between objective measurements and none-some-much ratings. Typically a large number of subjective evaluators (e.g., 44 people or more) are used to evaluate the system. These subjective evaluators listen to test messages and rate the effect of the objective characteristic on the manifestation. For example, the evaluator will listen to a test signal or series of test signals with varying signal noise (an objective characteristic) and then describe the signal as having "none", "some", or "much" noisiness (a quality characteristic). The same tests are performed for the other objective characteristics to determine the perceived effect on the voice signal. These tests can be performed by varying one characteristic at a time or by varying more than one objective characteristic. An evaluator is usually also asked to evaluate the effect on the voice signal and the overall quality of the message.

Evaluation voice messages are generated by varying selected ones of the objective characteristics. For example, a first evaluation message may have 35 dBrnc noise, −25 dB loss, packet loss at a rate of one packet per minute, echo path loss of −25 dB, and an echo path delay of 20 msec. Other evaluation messages would have a different set of values for these characteristics. To assure independence from message content, various messages may be used having the same combination of objective characteristics.

The evaluation voice messages can be generated prior to empirical testing or can be real-time telephone conversations. Prior generated messages are useful because parameters can be precisely varied in the laboratory before hand and the content can be held constant. Real-time conversations are useful because parties on either end can evaluate the call.

The empirical data from test calls is captured and summarized to map the combined effects of objective characteristics such as noise, signal level, distortion, and echo into a perceived quality level. Because this mapping is independent of the underlying transport, figures taken from, for example, common analog telephony may be applied here as well. However, if the circuit under test differs substantially from the circuit used to generate the data, such as by having a different bandwidth, then a new characterization is required.

The test data can also be used to develop a mean opinion score (MOS) for each of the combinations of subjective quantifications. A mean opinion score provides the average score for all (or most) subjective evaluators. For example, a system can be used where the B (bad), P (poor), F (fair), G (good), and E (excellent) are rated at 0, 1, 2, 3, and 4, respectively. Accordingly, a perfect score would be 4.0 (e.g., all evaluators provide a rating of "E" or four points).

In the preferred embodiment, the BPFGE-rated MOS is used along with the probability P(UDI) that the line is acceptable. The combination provides valuable information because, for example, where a MOS of 3.6 is very good and might normally be considered to guarantee user satisfaction, studies have shown that users will nonetheless complain of poor quality when the P(UDI) is greater than six percent regardless of the MOS. Therefore, predictions of overall service acceptability are best made considering both MOS and P(UDI).

The present inventor has determined that when voice signals are transmitted via a packet-switched networks, light to moderate levels of packet loss in the packet-switched network can affect the voice speech signals in a manner that may be perceived as speech distortion.

Figure 3A:
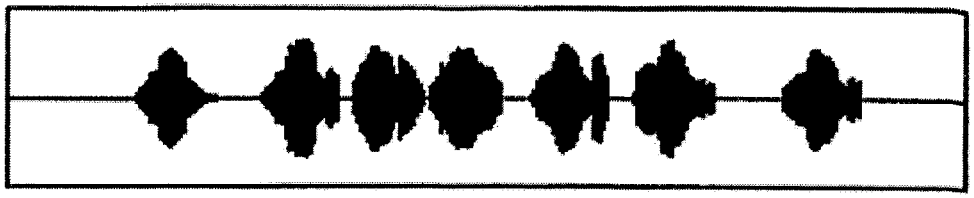
FIGS. 3a–3c are waveforms illustrating the effect of packet loss on a packetized voice signal.
Figure 3B:
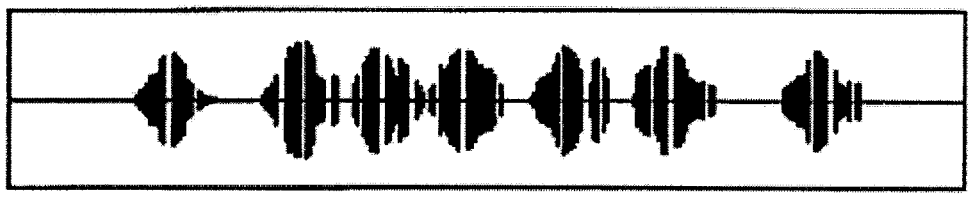
Figure 3C:

Depending on what type of the codec is used, if any, packet loss may result in a incidence of short dropouts that cause distorted waveforms, or a so-called "warble" effect. This new form of distortion can be correlated with an objective measurement of the rate of loss of packets. FIGS. 3*a*–3*c* illustrate an example of the effect of packet loss on a voice signal. FIG. 3*a* illustrates a voice signal with no appreciable packet loss ("none"). FIG. 3*b* illustrates the same voice signal with packet loss at the rate of 5 packets/minute while FIG. 3*c* illustrates the voice signal with packet loss at the rate of 15 packets/minute. The effect of these different levels can be correlated with the subjective perception of speech distortion in a voice signal, to surmise that, absent other gauges of speech distortion, nearly all users will report speech distortion as "none" for the case of FIG. 3a and "much" for the case of FIG. 3c. Further empirical testing will reveal the percentage of "none," "some," and "much" responses for the case of FIG. 3b.

It is expected that, depending on many factors such as the severity of packet loss and the sensitivity of a given codec scheme to such loss, the incidence of packet loss rate may cause a mixture of speech distortion and drop-out effects. Severe drop-out effects may obliterate entire spoken syllables or words. Generally, when packet loss is so severe as to cause drop-outs affecting intelligibility, the packet loss problem clearly must be corrected before a toll-quality speech channel can be established. The main intent of the method taught herein is to characterize less severe forms of degradation, wherein the speech signal is at least intelligible. Therefore, drop-out effects are not measured or explicitly considered in the exemplary embodiment taught herein.

Figure 9:
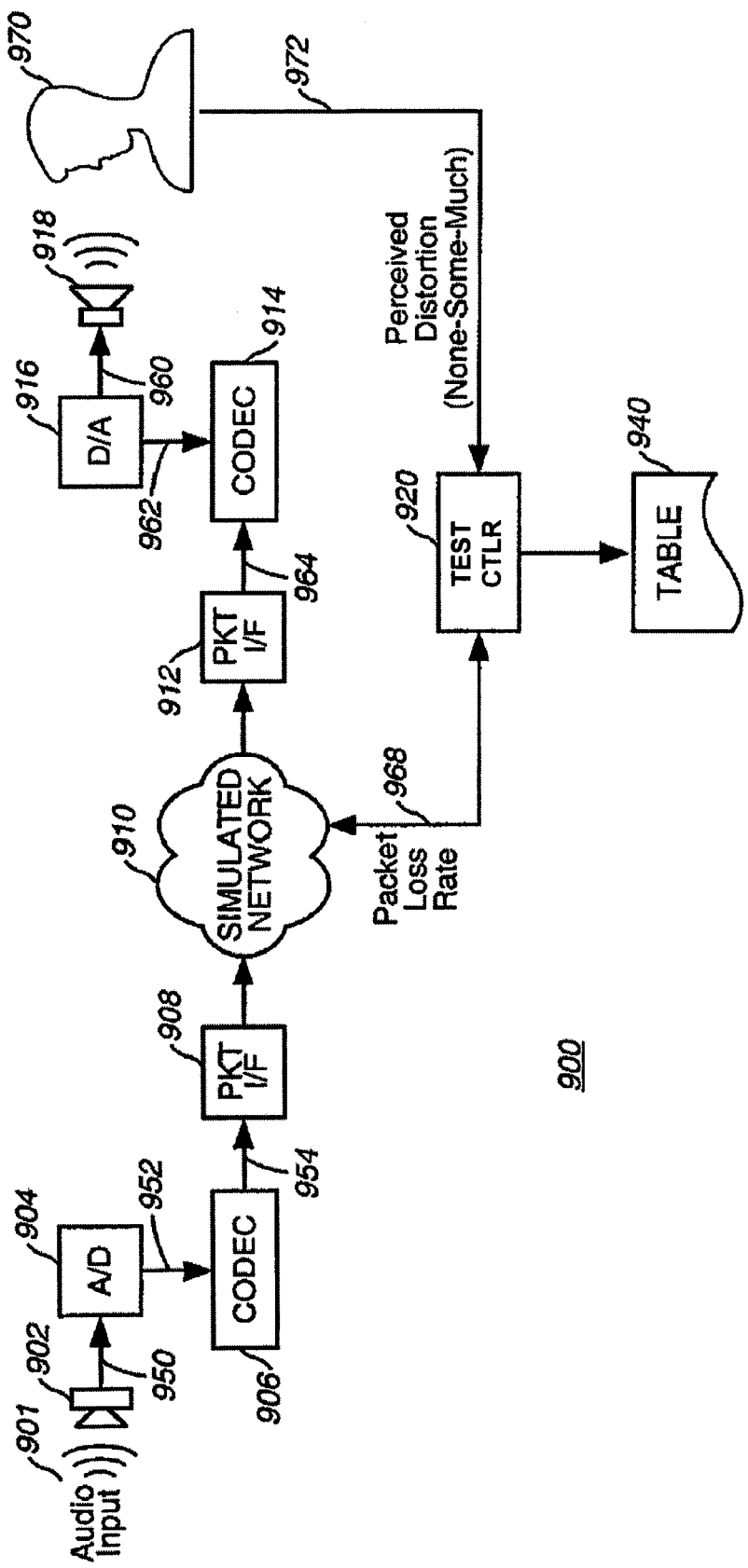
FIG. 9 is a block diagram of an apparatus for assessing the effects of packet loss rate upon perceived distortion.

FIG. 9 of the accompanying drawings depicts an example test apparatus 900 for taking measurements of perceived speech distortion as a function of packet loss rate and in the context of a given codec scheme. Audible sound input 901, such as speech, is received at microphone 902 and transduced into an analog electrical signal appearing at connection 950. An analog-to-digital converter 904 samples the incoming analog signal at regular time intervals and creates a digitized representation of the momentary value of the analog signal at each sampling time. This results in a stream of digital data at connection 952 as a digital representation of signal 901.

In many cases, a codec 906 is employed to accept the stream of digitized samples and convert them into an alternate representation. Codec 906 may implement the popular G.729A encoding, for example. The encoding function of codec 906 is typically used to transform the digitized samples into a compact digitally-encoded description that allows for substantially reproducing a waveform without explicitly conveying each digitized sample point. The encoded digital representation from codec 906 is output as a stream of data along connection 954. Packet interface 908 packetizes the data stream from connection 954 and delivers the packets into a data network 910 for transport to a destination packet interface 912. As best as possible, destination packet interface 912 collects the received packets and reassembles a data stream. Ideally, this data stream, present along connection 964, should be identical to the data stream at connection 954. However, due to packet loss within network 910, the data stream along 964 may not be a complete replica of the original data stream. The data stream along connection 964 is input to codec 914, the decoding function of which attempts to reconstruct a digital representation of audio input 901 along connection 962. If the codec and packet transport mechanisms are working properly, the digitized signal along connection 962 should be a fairly accurate reproduction of the signal present along connection 952. Finally, the data stream along connection 962 is provided to a digital-to-analog converter 916, which renders a reproduced analog signal along connection 960. This analog signal may be amplified and supplied to a speaker, telephone earpiece or other type of transducer 918 to create sound waves that may be heard by a listener 970 listening to the communicated audio.

Network 910 may be an actual packet network or a simulation thereof. By applying control through a connection 968, a test controller 920 causes a rate of packet loss to occur in network 910. Test controller 920 then collects information about the perceived distortion from listener 970 in response to the packet loss rate imposed by test controller 920. After accumulating empirical distortion observations for many levels of packet loss rate, a report table is generated summarizing the average reportings of "None-Some-Much" distortion versus packet loss rate for the given codec scheme used. Using a method similar to that outlined in FIG. 10, test controller 920 coordinates the setting of packet loss rate and collecting of corresponding distortion ratings. The role of test controller 920 may be embodied in an automated system, such as a computer or test equipment controller, or may simply be fulfilled by a human operator adjusting packet loss rate and recording the subjective distortion observations.

Although FIG. 9 portrays network 910 as having an adjustable packet loss rate as controlled by input along connection 968, those of ordinary skill in the art will recognize that there are a variety of ways to obtain distortion data for various packet loss rates. Network 910 may be an actual packet-switched network and means may be employed to measure the occurrence of packet loss between sending packet interface 908 and receiving packet interface 912. As the load upon network 910 is increased to near full capacity, the packet loss rate will tend to increase. By controlling the load on the network, various packet loss rates may be obtained along with corresponding distortion measurements. In another variation, packet loss rate of an active network may simply be monitored as traffic volumes fluctuate. Over a sufficient observation time, various packet loss rates will be observed and the resulting distortion may be recorded. The measured packet loss rate may simply be provided as input to test controller 920 so that subjective distortion observations may be correlated to the occurrence of certain packet loss rates.

Aside from using an actual transport network to inject packet loss, it is possible to simulate the packet environment without using a network. A digitized audio signal, as might be present along connection 952, may be stored in the form of a data file on a computer system. The processes of encoding and decoding the signal may be performed by software acting upon the data file. Packetization and loss of packets may likewise be simulated in software. The resulting signal data may then be analyzed or streamed to a D/A converter and loudspeaker so that any effects of packet loss may be determined. As a more real-time alternative, a digital signal processor (DSP) may be employed to emulate codec functions and may be used to inject artificial packet loss at various rates.

All of these techniques amount to characterizing distortion at various packet loss rates for a given codec scheme. This characterization is preferably performed for a large number of different listeners and the results are averaged and normalized. Table 2 represents an example form for expressing the characterization results.

TABLE 2

Expected Incidence and Severity of Speech Distortion as a Function of Packet Loss Rates

| No. of Packets Dropped/ Lost per Second | Reports of Speech Distortion | | |
|---|---|---|---|
| | None | Some | Much |
| 0.1 | Pn(0.1) | Ps(0.1) | Pm(0.1) |
| 0.25 | Pn(0.25) | Ps(0.25) | Pm(0.25) |
| 0.5 | Pn(0.5) | Ps(0.5) | Pm(0.5) |

TABLE 2-continued

Expected Incidence and Severity of Speech Distortion
as a Function of Packet Loss Rates

| No. of Packets Dropped/ Lost per Second | Reports of Speech Distortion | | |
|---|---|---|---|
| | None | Some | Much |
| 0.75 | Pn(0.75) | Ps(0.75) | Pm(0.75) |
| 1.0 | Pn(1) | Ps(1) | Pm(1) |
| 1.5 | Pn(1.5) | Ps(1.5) | Pm(1.5) |
| 2 | Pn(2) | Ps(2) | Pm(2) |
| 4 | Pn(4) | Ps(4) | Pm(4) |
| 5 | Pn(5) | Ps(5) | Pm(5) |

For each value of packet loss rate in Table 2, the relative proportions of distortion being reported as "none", "some" and "much" are expressed and should add up to equal one. For example, a given codec arrangement subjected to an average packet loss rate of 1 packet per second might be reported as having no degradation in 45% of the empirical samples, as having some degradation in 35% of the samples, and having "much" degradation in 20% of the samples.

As described later in conjunction with FIGS. 6 and 7, the empirically determined relationship in Table 2 may be used to transform a body of SAT data to reflect a given incidence of packet loss.

The present invention may be utilized in a variety of contexts. For example, in one embodiment, it is contemplated to repeat the empirical experiments to account for new effects in the packet-switched realm, for new spoken languages or coding schemes wherein some impairments may have a greater or lesser effect, or for new channel bandwidths.

For example, empirical test results may be different for voice signals spoken in English as opposed to Chinese. As a result, a network in the United States may be optimized differently than one in China. When setting up an international calling plan, the user could specify a language and calls could be routed to optimize the quality for this language. This specification can be for all calls or include different optimizations depending upon the telephone number on the other end.

In one aspect, the present invention solves the problem of how to measure and express the quality of a packet-switched connection and especially, how to predict the callers' responses to a prospective type of connection or component before it is actually released into use. This technique can be used in a variety of applications.

One embodiment is envisioned as a workstation, perhaps even coupled to a network of interest, wherein objective measurements are stored and analyzed according to the process of the present invention. An engineer looking for problems areas within the network, or a sales engineer comparing qualities of various options, may access the workstation to perform projections applicable to some or all of the network.

Another embodiment is envisioned as test equipment that performs measurements or receives data pertaining to a channel under test, including packet loss rate and packet delay, and then applies the above process to output a P(UDI) and MOS as quality indices for the channel under test. The test equipment might also perform a sensitivity analysis to identify which of the objective measurements should be adjusted to best improve the performance of the channel. Without the present invention, an engineer might be inclined to make a decision based upon a noise parameter whereas the more significant factor might be distortion due to dropouts.

Figure 4:
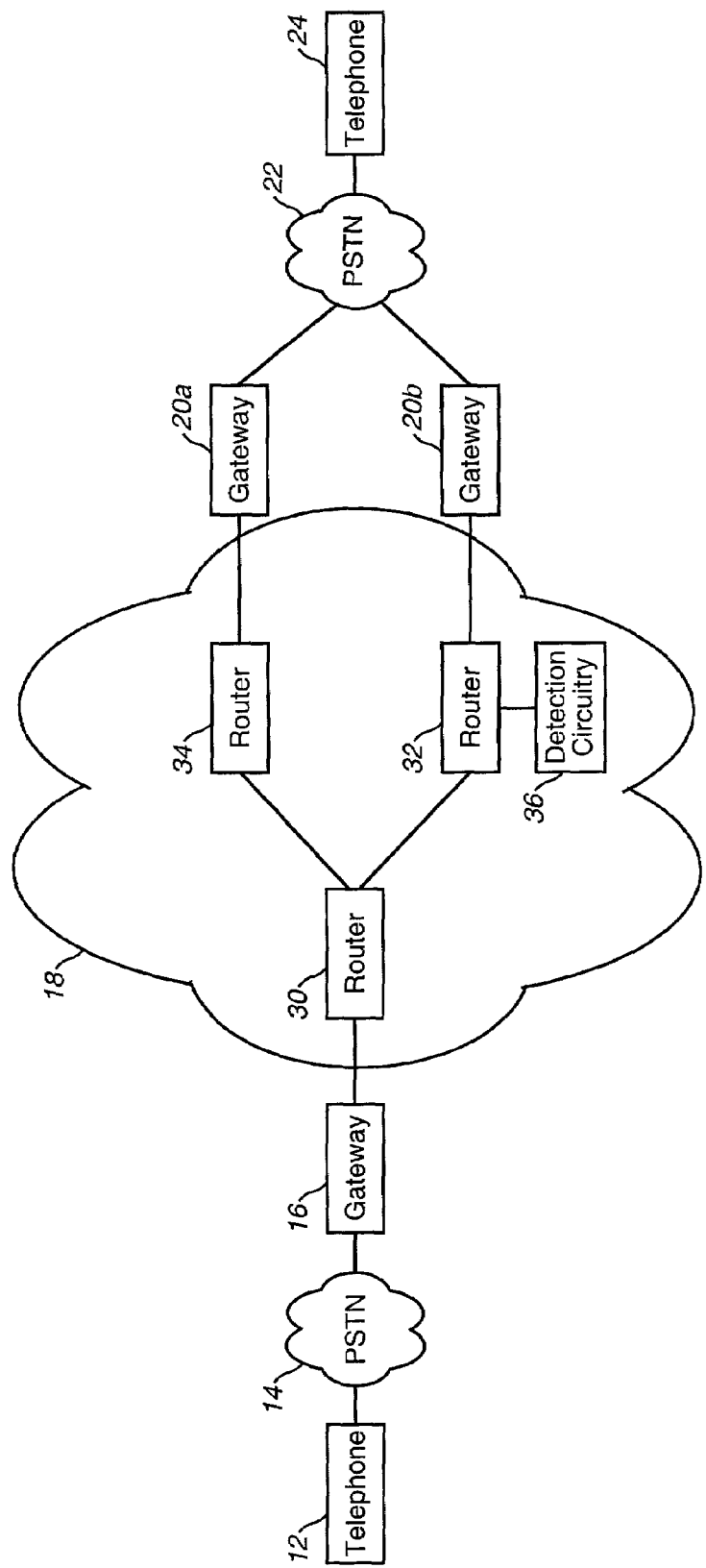
FIG. 4 is a block diagram of communication network that includes a quality control system of the present invention.
Figure 5:
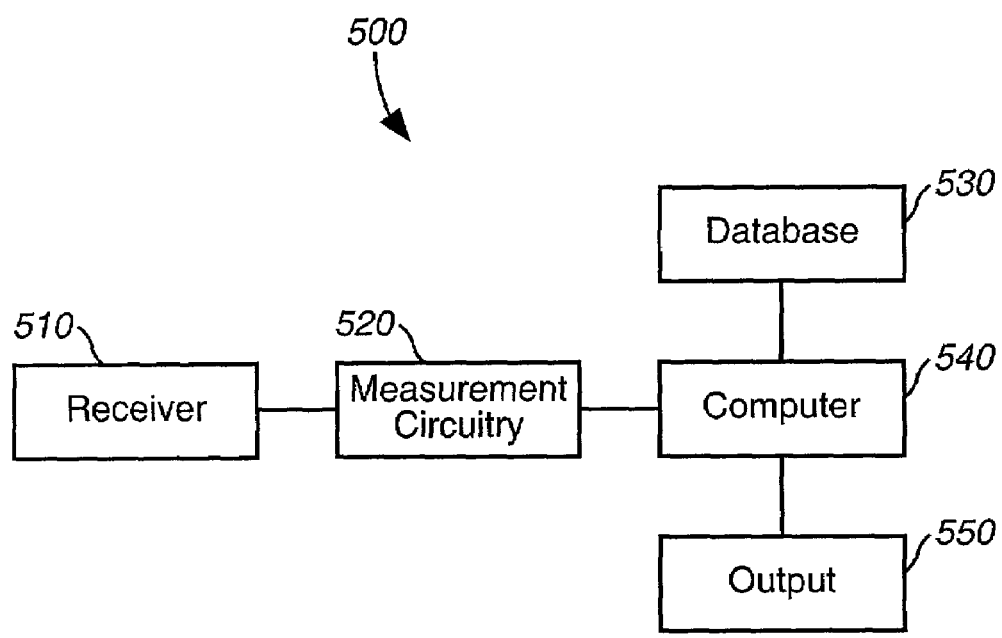
FIG. 5 is a block diagram of an apparatus that can be used to evaluate a communication channel.

As an example, FIG. 5 illustrates a system 500 for evaluating the quality of a packet-switched voice channel. A receiver 510 is coupled to the packet-switched voice channel (not shown). Receiver 510 can, for example, be coupled a router (see routers 30, 32, 34 in FIG. 4), a gateway (see gateways 16, 20 in FIG. 1a), or another portion of the channel. Alternatively, the receiver can be coupled to a specific piece of equipment which is not coupled to a network. In any event, the receiver 510 will receive a voice signal from the packet-switched voice connection.

Measurement circuitry 520 is coupled to the receiver 510. The measurement circuitry 520 measures objective characteristics of the voice signal. Preferably, one of these objective characteristics is the rate of packet loss. As discussed above, each of the objective characteristics is related to a plurality of quality characteristics affecting the quality of the voice signal as perceived by users. Using techniques described above, measurements of the objective characteristics can be translated into subjective quantifications of each of the quality characteristics.

The system 500 also includes a database 530 that stores an effects matrix (see element 230 of FIG. 2). As before, the effects matrix provides quality information for voice signals that include different combinations of subjective quantifications for each quality characteristic. The quality information preferably includes as indices both a mean opinion score (MOS) data and a probability that the voice signal is of an acceptable quality level (e.g. the P(UDI)).

Computer apparatus 540 runs software that calculates the quality information for a given input voice signal. This software utilizes measurements of the objective characteristics, including packet loss and packet delay and the effects matrix to generate quality information for the voice signal. For example, the software would preferably translate the objective characteristics into a specific combination of subjective quantifications. It would then transform the subjective quantifications based on the measured packet loss rate, apply the effects matrix to the transformed subjective data and then apply the effects of packet delay to arrive at composite predicted P(UDI) and MOS values.

Once the quality information is calculated, it will be utilized by output circuitry 550. The output circuitry 550 will depend upon the specific application. In an engineering test set, for example, output circuitry 550 may comprise a visual display or a file (e.g., in system memory or on a disk). Output circuitry 550 could also comprise a port where the data is transported from computer 540.

In commercial network evaluation applications, as another example, output circuitry 550 could comprise a connection to real-time control circuitry (e.g., as could be used in the example of FIG. 4). Alternatively, or in addition, output circuitry could provide a service message to a technician, for example, by pager, e-mail, audio display and/or visual display. Other examples exist. Certainly any of the examples provided with the engineering test set example would also apply in commercial network evaluation applications, and vice versa.

Yet another application of the present invention is with the use of a real-time control system for a telephone network. Such a system is described with reference to FIG. 4, which illustrates a hybrid network similar to the one described with respect to FIG. 1a. The control system would work equally as well with an end-to-end packet-switched telephony system such as the one shown in FIG. 1b.

To begin, it is understood that the block diagram of FIG. 4 (as well as FIGS. 1a and 1b) is a simplification of what a "real world" network would comprise. Much equipment is not illustrated in FIG. 4 for the sake of simplicity. For example, the routing within the packet-switched network 18 is illustrated by three routers 30, 32 and 34. In a typical real world system, more routers as well as other components would be used.

As discussed above, a phone call is routed between gateway 16 and gateway 20 (either 20a or 20b) so that users at telephones 12 and 24 may carry on a conversation. In particular, gateway 16 is coupled to a router 30. Router 30 reads the address on the packets and sends them to router 32 (via any of a number of pathways which may vary between packets). Router 32 is coupled to gateway 20b which provides the signal to the circuit switched telephone network 22 and then to telephone 24.

Detection circuitry 36 is coupled to router 32 and is used to measure objective characteristics of the packet-switched signal at router 32. For example, detection circuitry 36 may be software running on a computer (e.g., the same computer which serves as router 32) to measure the number of packets lost at the router. Based on the packet loss, and possibly other objective characteristics such as real-time transport delay, the detection circuit calculates the P(UDI) of the signal. If the P(UDI) goes above a certain threshold, the detection circuit will cause a message to be sent to router 30 that will cause the signals to be rerouted away from the troublesome portion of the network. In the illustrated example, router 30 will re-route the voice traffic to router 34, which is coupled to gateway 20a. Detection circuitry 36 may also calculate a MOS or other quality-related index and cause rerouting of signals accordingly.

Detection circuitry 30 can be incorporated in many different portions of the network. In this manner, the source of errors can be detected. With this information, calls can be re-routed and service personnel can be notified. For example, an automatic message, e.g., visual indication, pager, e-mail, can be initiated when an error is found. Using a system, such as the one described here, would lower the number of dissatisfied customers by predicting and correcting low quality voice connections.

As yet another example, the present invention may used to aid in the design of network components. Since the invention provides a mathematical model, an engineer can predict what would happen if the characteristics of one of the components were to change. For example, an engineer may wish to lower the performance requirements of an echo canceler, to lower cost. Before building new equipment, the effect of such a redesign could be predicted and any desirable design modifications made before finalizing the design.

Figure 6:
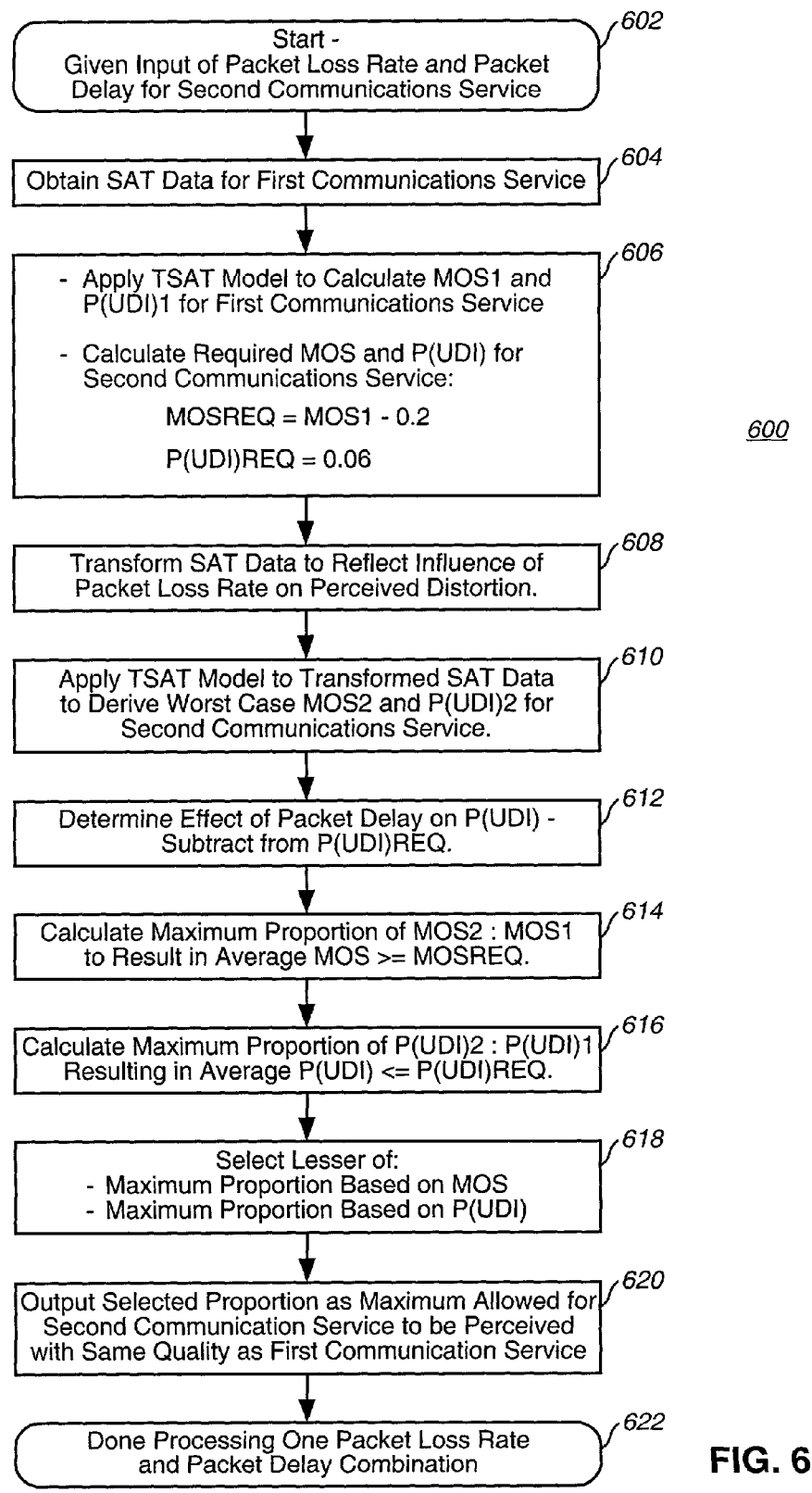
FIG. 6 is a flowchart of a process for determining, in a second communications service, the maximum proportion of communications that may suffer a given packet delay and packet loss rate and still be perceived as being of substantially the same quality as a first communications service.

FIG. 6 depicts the steps in a process for determining what performance is required of a second communications service so that it is perceived to have the same quality as a first communications service, especially where the second communications service is subject to impairments not encountered by the first communications service. The quality of the first communications service is well characterized and described by SAT statistics provided as input to the process. The second communications service is subject to variable occurrence of impairments, namely packet loss and packet delay. The process of FIG. 6 determines how often the second communications service may exhibit the worst case impairments yet still be perceived as being of substantially the same quality as the first communications service.

In FIG. 6, process 600 begins with step 602 whereupon a given packet delay and packet loss rate for a second communications service are provided as input. The remainder of process 600 is then executed to determine the maximum proportion of communications that may exhibit the given packet delay and packet loss rate while maintaining the perception that the second communications service is of substantially the same quality as a first communications service.

After receiving input and initiating the process in step 602, step 604 is executed wherein the SAT measurements for the first communications service are obtained. Obtaining the SAT measurements usually amounts to merely retrieving the previously compiled data from a repository, but may also involve taking measurements to collect such data at the time of need. As described earlier, the SAT measurements are generally data compiled from many thousands of test phone calls, with each call being subjectively evaluated in terms of perceived effect of each type of impairment as well as an overall assessment of communications quality. Where each impairment is rated in terms of "none-some-much", each combination of impairment levels will be reported with some likelihood. For example, a combination of reported values such as "none-some-some-none" referring to the extent of low volume, noise, distortion and echo, respectively, may be reported in some proportion of the test calls. For the purposes of step 604, only this characteristic proportion for each combination of impairments is needed.

Next, in step 606, an effects model is applied to derive an expected mean opinion score, MOS1, based upon the SAT measurements obtained in step 604. MOS1 is a mean opinion score representing the quality typically provided by a first communication service, such as a toll-quality connection through a circuit-switched telephone network. A P(UDI)1 value is also obtained representing a "baseline" value associated with the first communication service.

Also in step 606 are obtained MOSREQ and P(UDI)REQ, which describe the quality measurements required of the second communications network to be perceptually equal to or better than the first communications service.

In accordance with a preferred exemplary embodiment, the MOSREQ value is obtained by simply subtracting 0.2 from the MOS1 value. This is based upon the observation that differences of less than 0.2 units in the mean opinion score are imperceptible. A second communications service exhibiting a MOS within 0.2 points of that of the first communications network will be perceived as being of similar quality.

In step 606, P(UDI)REQ is arbitrarily set to 0.06 in accordance with a preferred exemplary embodiment. This is based upon the empirical observation that any communications service becomes noticeably degraded when P(UDI) exceeds 0.06. In the case of P(UDI), this threshold is more important than adhering to the P(UDI)1 value of the first communications service.

Proceeding to step 608, the SAT data obtained in step 604 is combined with a table based on empirical observations of how packet loss rate affects perceived speech distortion. (See Table 2.) The result is a transformed version of the SAT data with the proportions of occurrences altered to reflect the influence of a particular packet loss rate. Given the ability to objectively measure speech distortion independently of other manifestations of packet loss, such as prolonged drop-outs, it is plausible to transform the speech distortion values in an existing body of SAT data in this manner. A process by which the SAT data is transformed is described later in conjunction with FIG. 7.

In step 610, the transformed SAT data from step 608 is convolved with the TSAT model to determine the MOS and P(UDI) values expected for the second communications service being subject to the given packet loss rate. These values are denoted by MOS2 and P(UDI)2.

The process continues then to step 612, wherein the contribution of packet delay to P(UDI) is assessed and subtracted from the value of P(UDI)REQ. Experiments show that packet delay affects P(UDI) in an additive manner and is independent of the other forms of degradation. Therefore, it is valid to simply lower the P(UDI)REQ margin by subtracting the effects of packet delay.

Figure 8:
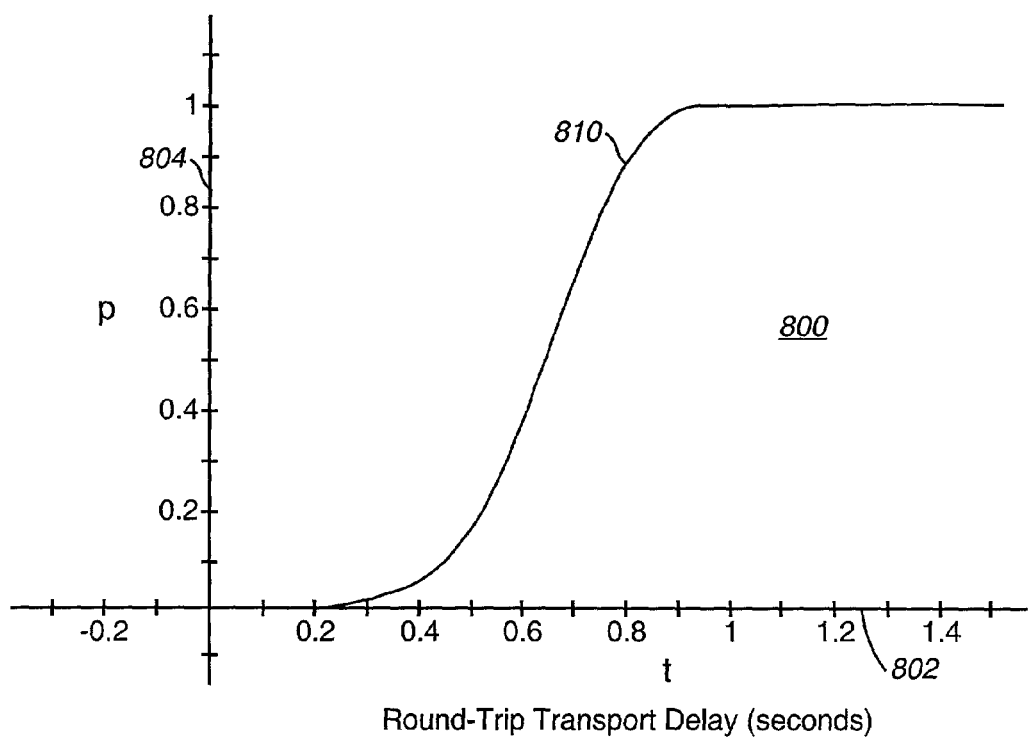
FIG. 8 is a graph depicting the effect of packet delay upon incidence of user complaints for a communication service.

The effect of packet delay upon P(UDI) may be approximated by a plot such as graph 800 depicted in FIG. 8. Graph 800 may be determined by empirical experiments similar to those described earlier for characterizing the effects of packet loss. Curve 810 depicts the relationship between transport delay, such as packet delay, and the proportion of instances in which users will complain about the delay impeding conversation. Such delay may arise from encoding or decoding of a signal at either end of communications channel, as well as from time delay in the signal or data being transported through a network. Such delay is independent of echo delay and can be so lengthy as to interfere with normal dialog among two users.

Transport delay causes mutual interruption, unexplained speaker hesitation, or confusion as to who is going to speak next due to unexpected pauses in the flow of conversation. The natural coordination among the communicating parties is objectionably impaired and may even render the communication service unusable.

Given an existing P(UDI) and a packet delay that will further impact system performance, a corrected P(UDI) may be calculated as follows:

$$P(UDI)'=P(UDI)+(1-P(UDI))*f(t)$$

where f(t) is a normalized function describing the empirically derived curve 810.

Returning to step 612 of FIG. 6, after the packet delay effect is estimated and used to calculate a reduced value for P(UDI)REQ, which may be denoted by P(UDI)REQr, the process continues with step 614 wherein a maximum proportion of degraded calls is calculated based on the minimum MOS requirement set earlier in step 606.

A communications service using a packet-switched transport will probably not experience a constant packet loss rate. The packet loss rate will vary from moment to moment and from session to session. The perceived quality of such a communications service will be an average of some instances degraded by a given packet loss rate, some instances that are unaffected and are comparable to toll-quality circuit-switched transport, and some instances that are of intermediate quality. Hence, the preferred manner for describing acceptable performance is to express, for a given packet delay, a maximum proportion of the time that the communications service may experience a given worst case packet loss rate and still maintain sufficient averaged values for high MOS and low P(UDI).

In step 614 then, the required proportion of degraded instances to non-degraded instances is determined by solving the following equation for Plmos:

$$MOS1(1-Plmos)+MOS2(Plmos)=MOSREQ$$

This equation represents a linear mixture of communications instances wherein some instances exhibit no packet loss and are subjectively rated by MOS1 and other instances experience worst case packet loss and have a degraded value, MOS2. Plmos is the highest proportion of degraded instances whereby the mixture meets the limit set by MOSREQ.

In step 616, a similar determination is made based on the P(UDI) criterion, P(UDI)REQr. A proportion, Pludi, may be determined by solving the following equation:

$$P(UDI)1*(1-Pludi)+P(UDI)2*(Pludi)=P(UDI)REQr$$

Proceeding then to step 618, the lesser of the two proportions, Plmos and Pludi, is selected as being the limiting factor. Because both MOSREQ and P(UDI)REQr criteria must be met, the lesser of the two proportions determines the maximum permissible proportion of degraded communications satisfying both conditions.

In step 620, the lesser proportion selected in step 618 is output from the process to express the maximum allowable proportion of degraded communications such that the second communications service is perceived to be of substantially the same quality as the given first communications service. The output value may alternately be reported as one minus the proportion determined in step 618 to express the minimum proportion of communications that are required to be unaffected by the given packet loss rate.

Finally, the process of determining acceptable performance for a given packet delay and packet loss rate concludes in step 622. As those of skill in the art will appreciate, process 600 may be repeated for various combinations of packet delay and packet loss rate to generate a profile of acceptable performance for a communications service subject to these effects.

Figure 7:
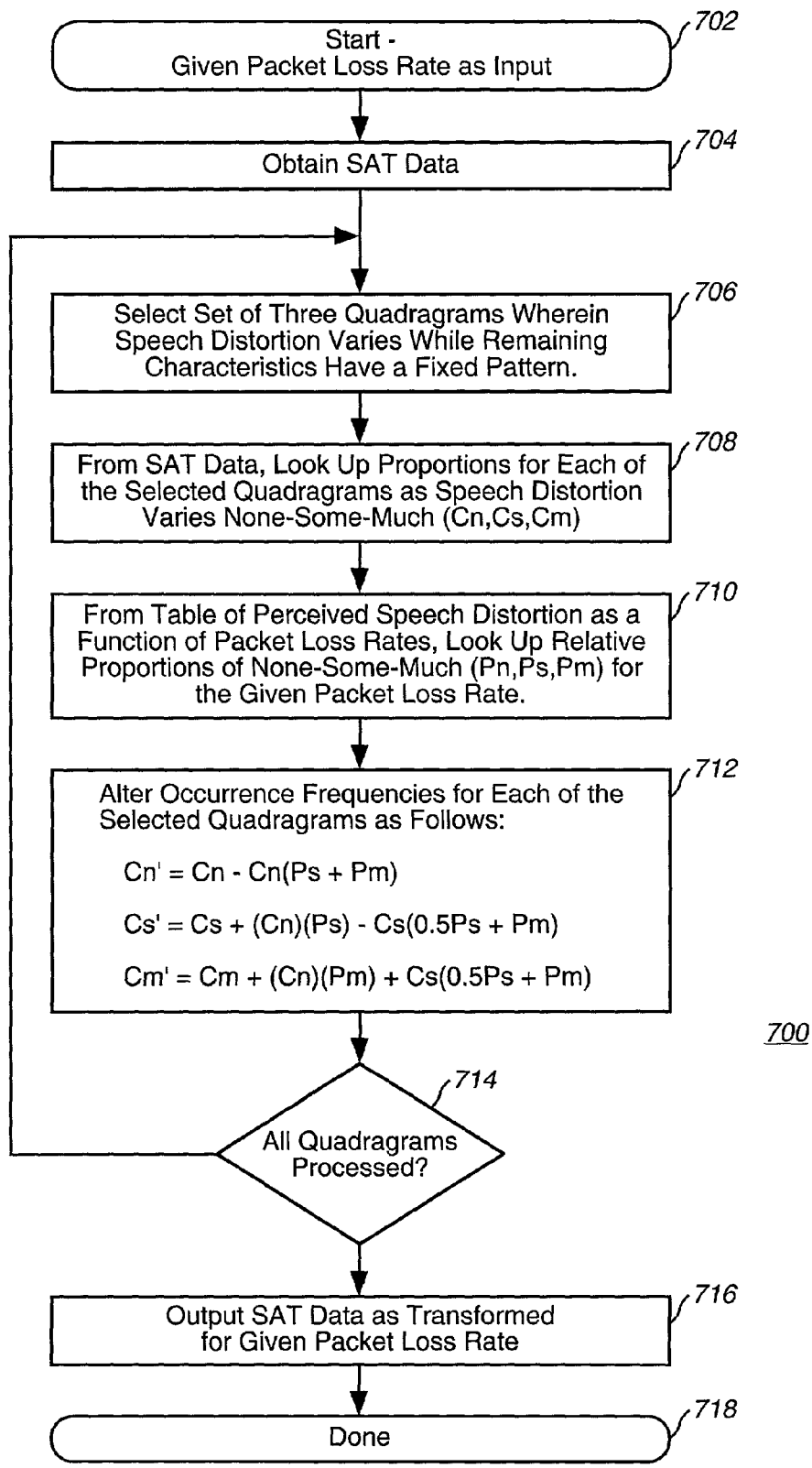
FIG. 7 is a flowchart of a process by which service attribute test data may be transformed to reflect the presence of a given packet loss rate.

Referring now to FIG. 7, a process 700 is described by which SAT data may be altered to take into account the effects of a certain packet loss rate. Particularly, in process 700, packet loss is taken into account by way of its effects upon the perceived levels of speech distortion. Process 700 describes the transformation of SAT data introduced earlier in step 608 of FIG. 6.

Process 700 commences with step 702 wherein a particular packet loss rate is provided as input. The remainder of process 700 takes place in the context of this given packet loss rate.

Next, in step 704, the SAT data is obtained for a communications service that is not subject to packet loss. In the context of this disclosure, this baseline performance data corresponds to the empirically tested characteristics of a first communications service, namely a traditional toll-quality connection.

Where four characteristics are recorded in the SAT data and each characteristic has three values (none, some, much), the SAT data comprises 81 combinations of values. Each combination of values may be referred to as a quadragram. Each quadragram in the SAT data will have an associated count or proportion of occurrence.

Step 706 refers to the step of selecting a subset of quadragrams in the SAT data wherein the reported speech distortion characteristic varies from "none" to "some" to "much" while other characteristics have a fixed pattern. This means that, in step 706, three quadragrams will be selected as a context for subsequent processing in steps 708–712.

Then, in step 708, the proportions of occurrence associated with each of the three quadragrams selected in step 706 are retrieved from the SAT data. These values are represented by Cn, Cs, and Cm.

Processing continues in step 710 where another table is consulted which maps packet loss rate into perceived speech distortion. One such table is exemplified by Table II, presented earlier. For the packet loss rate that was input in step 702, the table is used to find the relative proportions of speech distortion reported as "none-some-much" under otherwise optimal conditions. These values are represented by Pn, Ps, Pm.

In step 712, the proportions reported for the quadragrams selected in step 706 are altered to reflect the added degradation due to the given packet loss rate. In effect, the SAT data from step 704 is transformed to yield a new SAT data table as subject to packet loss. The proportions Pn, Ps, Pm act upon the original SAT proportions Cn, Cs, Cm to yield transformed SAT data Cn', Cs', Cm' as follows:

$$Cn'=Cn-Cn(Ps+Pm)$$

$$Cs'=Cs+(Cn)(Ps)-Cs(0.5\ Ps+Pm)$$

$$Cm'=Cm+(Cn)(Pm)+Cs(0.5\ Ps+Pm)$$

In step 714, it is determined whether the entire SAT data, meaning all of the quadragrams therein, have been processed by steps 706–712 to yield a transformed version of the SAT data. If there are any remaining quadragrams that have not been so altered, then process 700 returns to step 706 to select further unprocessed quadragrams. As those of skill in the art will recognize, a systematic or a sequential approach may be implemented to systematically "step through" the quadragram patterns and assure that all the SAT data is transformed.

If, in step 714, it is determined that all quadragrams have been processed, then step 716 is executed to output the completely transformed SAT data table which has been altered in accordance with a particular packet loss rate. Process 700 then terminates at step 718.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for determining acceptability of quality of a second communications service, in comparison to a first communications service which is deemed to exhibit acceptable quality, comprising the steps of:
    obtaining a first quality index pertaining to the first communications service;
    obtaining a second quality index pertaining to the second communications service; and
    determining that the second communication service is of unacceptable quality if the second quality index differs from the first quality index service by more than a selected amount.

2. The method of claim 1 wherein said first and second quality indices are mean opinion scores.

3. The method of claim 1 wherein said first and second quality indices relate to an average proportion of communications that would be rated as objectionable by users.

4. The method of claim 1 wherein obtaining a quality index pertaining to the second communications service comprises the steps of:
    measuring performance characteristics of the second network; and
    computing an expected quality index for the second communications service.

5. The method of claim 4 wherein said step of computing an expected quality index is performed by applying an effects matrix.

6. A method for determining the quality performance required of a second communications service in comparison to a first communications service comprising the steps of:
    obtaining a first quality index representing the quality of the first communication service;
    determining the effect of at least one performance characteristic of the second communication service upon a second quality index pertaining to the second communication service; and
    determining a value for the performance characteristic required to maintain the second quality index acceptably near the value of the first quality index.

7. The method of claim 6 wherein said first and second quality indices are mean opinion scores.

8. The method of claim 6 wherein said first and second quality indices relate to an average proportion of communications that would be rated as objectionable by users.

9. The method of claim 6 wherein said performance characteristic is packet loss rate.

10. The method of claim 6 wherein said performance characteristic is packet delay.

11. A method for determining the quality performance required of a second communications service in comparison to a first communications service comprising the steps of:
    obtaining a first quality index representing the quality of the first communication service;
    determining the effect of a first performance characteristic of the second communication service upon a second quality index pertaining to the second communication service;
    determining the effect of a second performance characteristic of the second communication service upon the second quality index pertaining to the second communication service;
    assuming a selected value for the first performance characteristic; and
    in the context of the selected value for the first performance characteristic, determining a value for the second performance characteristic required to maintain the second quality index acceptably near the value of the first quality index.

12. The method of claim 11 further comprising the step of determining that the first performance characteristic has an effect upon the second quality index that is independent of any other performance characteristics.

13. The method of claim 11 further comprising the step of selecting a first performance characteristic which has an effect upon the second quality index that is independent of any other performance characteristics.

14. The method of claim 11 further comprising the step of selecting a first performance characteristic which has an effect upon the second quality index that is independent of the second performance characteristic.

15. The method of claim 11 wherein said first and second quality indices relate to an average proportion of communications that would be rated as objectionable by users.

16. The method of claim 11 wherein said first and second quality indices are mean opinion scores.

17. The method of claim 11 wherein said first performance characteristic is packet delay.

18. The method of claim 11 wherein said second performance characteristic is packet loss rate.

19. A method for determining the quality performance required of a second communications service in comparison to a first communications service comprising the steps of:
obtaining a first quality index representing the quality of the first communication service;
determining a second quality index representing the quality of the second communication service subject to at least one degraded performance characteristic;
determining an averaged composite quality index for communications occurring through the second communications network, said averaged composite quality index being an average value resulting from a mixture of first communications occurring without the degraded performance characteristic and second communications occurring with the degraded performance characteristic; and
expressing the required quality performance of the second communication service as a proportion between said first communications and said second communications required to maintain said averaged composite quality index acceptably near the value of the first quality index.

20. The method of claim 19 wherein said first, second, and averaged composite quality indices are mean opinion scores.

21. The method of claim 19 wherein said first, second, and averaged composite quality indices are values associated with a percentage (P) of calls or connections that elicit unusable (U), difficult (D), or irritating (I) responses (P(UDI)).

22. A method for determining how a first performance characteristic having a given value affects the quality of a communication service, the method comprising:
obtaining an original data set pertaining to occurrences of various values of at least one second performance characteristic within the communication service;
determining the effect that the first performance characteristic has upon the occurrences of values of the second performance characteristic;
computing an altered data set by changing, in the original data set, the occurrences of values of the second performance characteristic assuming the first performance characteristic is set to said given value; and
computing a quality index for the communication service based upon the altered data set.

23. The method of claim 22 wherein said step of computing a quality index is performed by convolving the altered data set with an effects matrix.

24. The method of claim 22 wherein said quality index is a mean opinion score.

25. The method of claim 22 wherein said quality index relates to an average proportion of communications that would be rated as objectionable by users.

26. A method for determining acceptable quality of a second communication service, in comparison to a first communication service which exhibits acceptable quality, comprising the steps of:
measuring at least one performance characteristic for the first communication service;
from the measured performance characteristic for the first communication service, determining a first mean opinion score pertaining to the first communication service;
measuring least one performance characteristic for the second communication service;
from the measured performance characteristic for the second communication service, determining a second mean opinion score pertaining to the second communication service; and
determining that the second communication service is of unacceptable quality if the second mean opinion score is less than the first mean opinion score by more than a perceptible difference threshold.

27. The method of claim 26 further comprising the step of determining a P(UDI) value of the second communication service, said P(UDI) value relate to an average proportion of communications that would be rated as objectionable by users, and determining that the second communications is of unacceptable quality if the P(UDI) exceeds a threshold value.

28. The method of claim 27 wherein said threshold value for the P(UDI) of the second communications service is 0.06.

29. The method of claim 26 wherein said second communication service is subject to at least one impairment that does not affect the first communication service.

30. The method of claim 29 wherein said impairment is packet loss.

31. The method of claim 29 wherein said impairment is packet delay.

32. A method for determining the performance required of a second communications service to achieve acceptable quality in comparison to a first communications service, comprising the steps of:
obtaining a permissible P(UDI) limit, where P(UDI) relates to a percentage (P) of calls or connections that elicit unusable (U), difficult (D), or irritating (I) responses;
obtaining a first mean opinion score representing the quality of the first communication service;
determining a value of packet delay for the second communications service;
determining a reduced P(UDI) margin by subtracting the effects of the value of packet delay from the permissible P(UDI) limit;
obtaining an original data set comprising occurrences of values for performance characteristics absent the effects of packet loss;
transforming the original data set into a transformed data set based upon a given packet loss rate;
applying an effects matrix to the transformed data set to compute a predicted second mean opinion score and second P(UDI) for the second communications service;
determining a first maximum proportion of communications that may exhibit said second mean opinion score while maintaining an averaged mean opinion score that is acceptably close to said first mean opinion score;
determining a second maximum proportion of communications that may exhibit said second P(UDI) such that the averaged P(UDI) remains less than the reduced P(UDI) margin; and
selecting the lesser of the first and second maximum proportions as the maximum proportion of communications in the second communications service that may experience the given packet delay and packet loss rate yet still allow the second communications service to be perceived as having the same quality as the first communications service.

* * * * *